(No Model.)
D. DURAND.
PLATE GLASS BEVELING MACHINE.
No. 247,751. Patented Oct. 4, 1881.
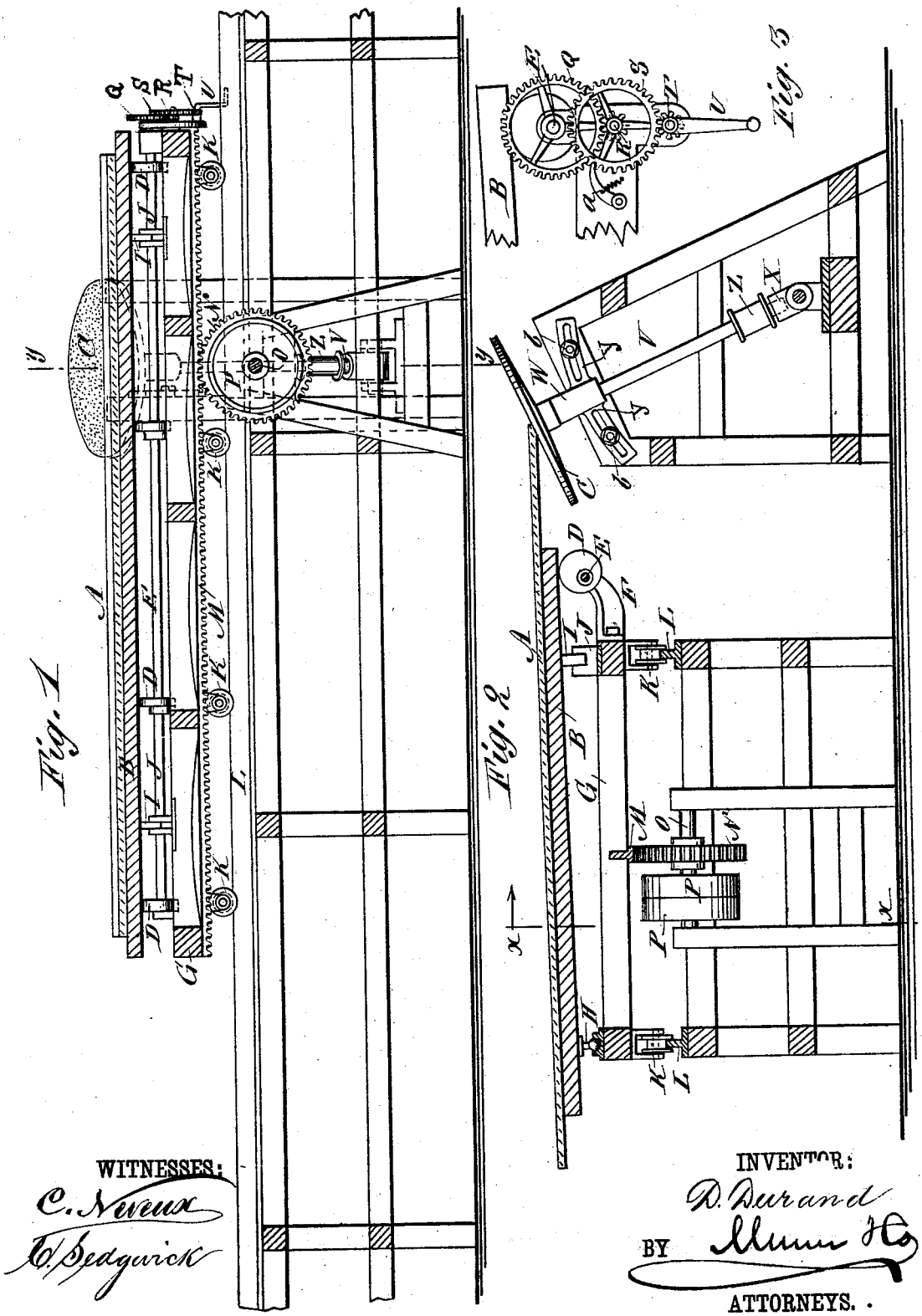
WITNESSES:
C. Neveux
C. Sedgwick
INVENTOR:
D. Durand
BY Munn & Co
ATTORNEYS.

United States Patent Office.

DOMINIQUE DURAND, OF MAMARONECK, NEW YORK.

PLATE-GLASS-BEVELING MACHINE.

SPECIFICATION forming part of Letters Patent No. 247,751, dated October 4, 1881.

Application filed February 10, 1881. (No model.)

*To all whom it may concern:*

Be it known that I, DOMINIQUE DURAND, of Mamaroneck, Westchester county, New York, have invented a new and Improved Plate-Glass-Beveling Machine, of which the following is a specification.

The object of the invention is to provide a new and improved machine for making on glass plates bevels of any desired width or inclination.

The invention consists in a table, upon which the glass plate to be beveled is placed, supported upon a series of eccentric-wheels mounted on a shaft passing along that edge of the table adjoining the grinding-wheel, which eccentrics can be rotated gradually by means of geared wheels, whereas the opposite edge of the table rests upon ball-and-socket joints; and it also consists in a grinding-wheel the shaft of which rests in a pivoted bearing, thus permitting the inclination of the shaft to be adjusted according to the desired bevel, all as hereinafter more fully described.

In the accompanying drawings, Figure 1 is a longitudinal sectional elevation of my improved glass-beveling machine on line $xx$, Fig. 2. Fig. 2 is a cross-sectional elevation of the same on line $yy$, Fig. 2; and Fig. 3 is a detail front elevation of the gearing for operating the eccentrics.

Similar letters of reference indicate corresponding parts.

The glass plate A, the edge of which is to be beveled, is placed upon the table B, preferably made of iron, and is held thereon by suitable weights. This table B is supported along the edge adjoining the grinding-wheel C by a series of eccentrics, D D, mounted on a shaft, E, which is journaled in arms F F of a carriage, G, or in the carriage itself, whereas the opposite edge of the table is supported by a series of ball-and-socket joints, H, also attached to the carriage G. The longitudinal end of the table, supported by the eccentrics D D, is guided by a series of studs, I, or projections fitting in between two plates, J J, projecting upward from the top of the carriage G and separated a distance equal to the thickness of the stud I.

The carriage G is provided with wheels K, rolling on the tracks L, resting upon a suitable frame. A rack, M, extends longitudinally along the under side of the carriage, and the teeth of this rack engage with those of a geared wheel, N, mounted on a shaft, O, provided with the belt-pulleys P P. A cog-wheel, Q, is mounted on the end of the eccentric-shaft E, and this wheel Q engages with a pinion, R, which is mounted on the same shaft with a cog-wheel, S, which engages with a pinion, T, mounted on a shaft provided with a crank, U, so that a rotation of the crank U will produce a slight rise and fall of the table A, and the same can be raised or lowered distances that are hardly perceptible by moving the crank short distances. A spring-pawl, $a$, engages with the teeth of the wheel S to hold the table in the position to which it has been adjusted.

The grinding-wheel C is mounted on the shaft V, passing through the journal W, and resting in the pivoted step bearing X. A segmentally-slotted plate, Y, is fastened to the journal W, and by means of the nuts $b\ b$, passing through the slots of the plate Y, the journal may be locked in positions to suit any inclination of the shaft V. A belt-pulley, Z, is mounted on the shaft V. The bearing and journal of the driving-wheel C are fastened to a suitable frame.

The operation is as follows: The glass plate A having been placed upon the table B, the shaft E is rotated until the longest radius of the eccentrics extend upward. The shaft V is inclined more or less until the inclination of the wheel C is precisely the same as the inclination or angle of the desired bevel. Thus, if a very flat bevel is desired, the wheel C, and accordingly the shaft V, are but slightly inclined; but if a steeper bevel is required the inclination of the grinding-wheel C and the shaft V will have to be increased. The angles of the bevel are affected by the inclination of the wheel C and shaft V only, and not by the effect of the inclination of the table B. The wheel C having been adjusted, the power is applied. The belts passing over the pulleys P P also pass over some suitable devices for reversing the motion at the end of each trip, so that the wheel N will rotate in opposite directions alternately, and thus propel the carriage to and fro longitudinally. The edge of the glass plate is drawn over the grinding-disk C at each trip, and after a certain time the edge of the plate will have been ground off to such an extent that the grinding-wheel cannot attack or abrade the same. The crank U is then rotated more or less, as may be necessary, to move the eccentrics D a short distance, whereby the front edge of the table B and of the glass plate resting in it are slightly lowered, so that the grinding-disk can attack and abrade the edge of the glass. In a short time the grinding-wheel C will again fail to attack the edge of the plate A, and the crank U must again be rotated, and so on until the bevel has the desired width.

I am aware that eccentrics mounted on a shaft have been used in glass-grinding tables, and I do not intend to claim this invention, broadly; but heretofore the eccentrics did not support that edge of the table adjoining the grinding-wheel, but the opposite edge, and the eccentrics have not been used to gradually lower the plate upon the grinding-disk as the operation progressed, but have been used to vary the inclination of the bevel of the plate. The grinding-wheel has not been adjustable in inclination, and the various inclinations of the bevel have been obtained by giving the glass greater or less inclination.

As has been stated, I produce bevels of different angles by varying the inclination of the grinding-wheel, and this is not shown in any of the glass-grinding machines made heretofore.

If the grinding-stone becomes worn off, the table can conveniently be readjusted, so that the edge of the plate will rest on the stone in a different place by inclining the table either forward or backward and rotating the shaft E until the largest radius of the eccentrics extend upward, as in the first instance. When the grinding is completed, a smoothing-disk is mounted on the shaft V, and finally a polishing-disk is mounted on this shaft.

Having thus described my invention, I claim as new and desire to secure by Letters Patent—

1. In a plate-glass-beveling machine, the combination, with the carriage B and the table A, of the ball-and-socket joints H, supporting one edge of the table, and the eccentrics D D, supporting the opposite edge, adjoining the grinding-wheel, substantially as herein shown and described, for the purpose set forth.

2. In a plate-glass-beveling machine, the carriage G, constructed, substantially as herein shown and described, with a series of eccentrics for supporting one edge of the table, mounted on a shaft passing along that edge of the carriage adjoining the grinding-wheel, as set forth.

3. In a plate-glass-beveling machine, the combination, with a grinding-wheel, C, which can be adjusted in inclination, of the table B, the carriage G, having the shaft E, with the eccentrics D, mounted along the edge adjoining the grinding-wheel C, and pinions and geared wheels for gradually rotating the shaft E, substantially as herein shown and described, and for the purposes set forth.

4. In a plate-glass-beveling machine, the combination, with the grinding-wheel C, and with its shaft V, of the journal W, the segmentally-slotted plate Y, the bolts $b$, and the pivoted step-bearing X, substantially as herein shown and described, and for the purpose set forth.

DOMINIQUE DURAND.

Witnesses:
OSCAR F. GUNZ,
C. SEDGWICK.